(12) United States Patent
Murphy et al.

(10) Patent No.: US 8,157,010 B2
(45) Date of Patent: Apr. 17, 2012

(54) TREATMENT OF SUBTERRANEAN FORMATIONS

(75) Inventors: Christopher B. Murphy, Woodridge, IL (US); Jon O. Fabri, Charleston, SC (US); Phillip B. Reilly, Jr., Andover, NJ (US)

(73) Assignee: Polymer Ventures, Inc., Charleston, SC (US)

( * ) Notice: Subject to any disclaimer, the term of this patent is extended or adjusted under 35 U.S.C. 154(b) by 0 days.

(21) Appl. No.: 13/232,471

(22) Filed: Sep. 14, 2011

(65) Prior Publication Data

US 2012/0067585 A1    Mar. 22, 2012

Related U.S. Application Data

(60) Provisional application No. 61/384,974, filed on Sep. 21, 2010.

(51) Int. Cl.
| | |
|---|---|
| *E21B 43/12* | (2006.01) |
| *E21B 43/26* | (2006.01) |
| *C09K 8/575* | (2006.01) |
| *C09K 8/68* | (2006.01) |

(52) U.S. Cl. ...... 166/295; 166/275; 166/294; 166/305.1; 166/308.2; 175/72; 507/219; 507/922

(58) Field of Classification Search .......................... None
See application file for complete search history.

(56) References Cited

U.S. PATENT DOCUMENTS

| | | | | |
|---|---|---|---|---|
| 1,460,788 A | * | 7/1923 | Carman | 507/100 |
| 2,801,984 A | * | 8/1957 | Morgan et al. | 523/130 |
| 2,801,985 A | * | 8/1957 | Roth | 523/132 |
| 3,015,649 A | | 1/1962 | Zorn | |
| 3,106,541 A | | 10/1963 | Lipowski et al. | |
| 3,303,896 A | * | 2/1967 | Tillotson et al. | 175/69 |
| 3,410,649 A | | 11/1968 | Sellet | |
| 3,582,461 A | | 6/1971 | Lipowski et al. | |
| 3,843,524 A | * | 10/1974 | Perricone et al. | 507/103 |
| 4,383,077 A | | 5/1983 | Bankert | |
| 4,693,639 A | | 9/1987 | Hollenbeak et al. | |
| 4,719,021 A | * | 1/1988 | Branch, III | 507/107 |
| 4,757,862 A | * | 7/1988 | Naiman et al. | 166/295 |
| 4,974,678 A | | 12/1990 | Himes et al. | |
| 4,977,962 A | | 12/1990 | Himes et al. | |
| 5,208,216 A | * | 5/1993 | Williamson et al. | 507/120 |
| 5,635,458 A | * | 6/1997 | Lee et al. | 507/240 |
| 5,659,011 A | | 8/1997 | Waldmann | |
| 6,787,506 B2 | * | 9/2004 | Blair et al. | 507/222 |
| 7,740,071 B2 | | 6/2010 | Smith et al. | |
| 2003/0191030 A1 | * | 10/2003 | Blair et al. | 507/225 |

OTHER PUBLICATIONS

Global Impact, Adding Value to Paper, Feb. 2009, 20 pages.
Hoff et al., "Enhanced Wellbore Stabilization and Reservoir Productivity with Aphron Drilling Fluid Technology, Topical Report: Task 4.1 Correlation of Capillary Suction Time with Leak-Off Behavior," MASI Technologies LLC, Dec. 17, 2004, 15 pages.
OFITE Capillary Suction Timer Part No. 294-50 Instruction Manual, OFI Testing Equipment, Inc., May 28, 2009, 7 pages.

* cited by examiner

*Primary Examiner* — George Suchfield
(74) *Attorney, Agent, or Firm* — Marshall, Gerstein & Borun LLP

(57) ABSTRACT

A method of preparing and using a subterranean formation stabilization agent. The stabilization agent includes a guanidyl copolymer and may be admixed with a fracturing fluid and optionally brine. The stabilization agent is effective in preventing and/or reducing, for example, clay swelling and fines migration from a subterranean formation contacted with the stabilization agent.

30 Claims, No Drawings

TREATMENT OF SUBTERRANEAN FORMATIONS

CROSS-REFERENCE

A benefit of priority is claimed to U.S. Provisional Patent Application No. 61/384,974 filed 21 Sep. 2010, the disclosure of which is incorporated herein in its entirety.

FIELD OF DISCLOSURE

The present disclosure relates, generally, to the stabilization of subterranean formations by the addition of a guanidyl copolymer to the subterranean formation. The disclosure further relates to materials and methods for stabilizing subterranean formations, for example, by reducing clay swelling and/or fines migration.

BRIEF DESCRIPTION OF RELATED TECHNOLOGY

The production of hydrocarbons from subterranean formations is often effected by the presence of clays and other fines, which can migrate and plug off or restrict the flow of the hydrocarbon product. The migration of fines in a subterranean formation is often the result of clay swelling, salt dissolution, and/or the disturbance of fines by the introduction of fluids that are foreign to the formation. Typically, a foreign fluid (e.g., fracturing fluid or stabilizing fluid) is introduced into the formation for the purpose of completing and/or treating the formation to stimulate production of hydrocarbons by, for example, fracturing, acidizing, or stabilizing the well.

The fracturing fluids used throughout the oil and gas industry are based on a low-cost anionic friction reducer in combination with a clay stabilizer (e.g., choline chloride and/or trimethylamine). These fracturing fluids work adequately in formations where there is a relative high level of permeability, expressed in millidarcy.

The anionic friction reducer facilitates the fracturing of the subterranean formation by allowing the system to achieve a desired pressure in the fracturing zone and the choline chloride and/or trimethylamine help prevent the components of the formation (e.g., the sand and/or clay) from swelling and/or migrating while they are in contact with the fracturing fluids. Once the addition of fracturing fluid and thereby the choline chloride and/or trimethylamine is halted, they dilute out, and the components of the formation begin to swell and/or migrate in the reservoir water thereby reducing the permeability of the formation and the rate of hydrocarbon production. Due to this time limited effect, choline chloride and trimethylamine are often referred to as temporary clay stabilizers.

The composition and behavior of shale formations are notably different than those made of sand and/or clay. Shale consists of extremely fine (micron to submicron sized) particulates that are held together with water soluble salts (e.g., calcium chloride and/or barium chloride). Typically, shale formations have very low levels of permeability (often expressed in terms of microdarcy or nanodarcy (i.e., factors of 1000 lower than clay or sand formations) due to the extremely tight packing of its component minerals.

In shale formations, fracturing water or reservoir water dissolves water soluble minerals causing the formation to lose its structural integrity and plug the fractured zone with fines. Correspondingly, temporary clay stabilizers (e.g., choline chloride and/or trimethylamine) have displayed little effect on shale stability and cores start to plug shortly after the injection of water solutions containing low and even high concentrations (or percentages) of temporary clay stabilizers.

Notably, plugging of the core mirrors events happening during and after the fracturing of the shale formation. Fracturing the shale formation includes forcing millions of gallons of water into the shale (which dissolves the water-soluble salts and the shale begins to collapse), then removing the water of which less than 10% to 15% is typically recovered. This recovered water contains high levels of fine, suspended material, indicative of the collapse of the shale structure and the production of huge amounts of fines. Hydrocarbon production (e.g., natural gas and/or oil) from these systems might be steady for a short period but then rapidly declines, indicative of the disintegration of the formation and blockage of the fractured area.

A fracturing fluid that includes a permanent clay stabilizer, that additionally stabilizes shale formations, could increase hydrocarbon production, increase the amount of recovered water, and reduce the fines content of this water.

SUMMARY

In one embodiment, a subterranean formation can be stabilized by contacting the formation with a stabilization agent that includes a guanidyl copolymer. In one instance, the stabilization agent includes a water-soluble salt, for example, in a weight ratio of about 10:1 to about 1:10, grams guanidyl copolymer to grams water-soluble salt. In another instance, the stabilization agent includes a water-soluble friction reducer, for example, in a ratio of about 10:1 to about 1:10, grams guanidyl copolymer to grams water-soluble friction reducer. In yet another instance, the stabilization agent includes a friction reducer, a water-soluble salt and the guanidyl copolymer.

In another embodiment, the formation can be stabilized by mixing the stabilizing agent with a fracturing fluid, and contacting the formation with the fracturing fluid/stabilizing agent combination. The flow of hydrocarbon product from the subterranean formation contacted with the mixture of a guanidyl copolymer stabilizing agent and a fracturing fluid can be higher than the flow from the subterranean formation contacted with a fracturing fluid free of the stabilization agent. Furthermore, the hydrocarbon product can be free of, or include fewer particles from the subterranean formation (e.g., fines) than the hydrocarbon product from the subterranean formation contacted with the fracturing fluid free of the stabilization agent.

In another embodiment, hydrocarbon production can be increased by contacting the subterranean formation with a stabilization agent. In one instance, clay swelling and/or fines migration can be reduced by contacting the subterranean formation with a stabilization agent that comprises a guanidyl copolymer. In another instance, the stabilization agent also includes a cationic friction reducer. In still another instance, a well from which hydrocarbons have been extracted can be restabilized by contacting the hydraulically fractured subterranean formation with the stabilization agent. In yet another instance, hydrocarbons can be extracted from an oil containing subterranean formation comprising by providing, through a first borehole, a pressurized floodwater that comprises about 50 ppm to about 5,000 ppm, about 100 ppm to about 1,000 ppm, or about 200 ppm to about 600 ppm of a guanidyl copolymer; and recovering oil from the subterranean formation through a second borehole.

In still another embodiment, a bore hole can be flushed with a drilling fluid that comprises a guanidyl copolymer.

DETAILED DESCRIPTION

Disclosed herein is a permanent subterranean stabilization agent that includes a cationic polymer that is effective in low concentrations, and a method of using this stabilization agent for the production of hydrocarbons from subterranean formations. Herein, "permanent" means that the stabilization of the subterranean formation (as a function of time) is not dependent on the continued addition of the stabilization agent, preferably the subterranean formation remains stable for hydrocarbon production for at least one month after removal of the fracturing fluids that typically contain the stabilization agent. The subterranean formation can include clay, shale, sand, rock, solids added to the formation, and any other material encountered when drilling a hydrocarbon well.

The compounds, compositions and methods described herein may be understood more readily by reference to the following detailed description and the examples provided. It is to be understood that this invention is not limited to the specific components, articles, processes and/or conditions described, as these may, of course, vary. It is also to be understood that the terminology used herein is for the purpose of describing particular embodiments only and is not intended to be limiting.

Ranges may be expressed herein as from "about" or "approximately" one particular value or to "about" or "approximately" another particular value. When such a range is expressed, another embodiment includes from the one particular value or to the other particular value. Similarly, when values are expressed as approximations, by use of the antecedent "about," it will be understood that the particular value forms another embodiment.

In one embodiment, a stabilization agent includes a guanidyl copolymer that can be prepared, for example, from the condensation polymerization of a guanidyl reactant and a carbonyl reactant, see for example, U.S. Pat. No. 5,659,011 incorporated herein by reference in its entirety. In another embodiment, the guanidyl copolymer can be prepared from the condensation polymerization of a guanidyl reactant and an imine reactant. Typically, a condensation reaction is an acid or base catalyzed polymerization that produce(s) water, an alcohol, and/or an amine as a by-product.

The guanidyl copolymer can have a weight average molecular weight in a range of about 1,000 Dalton (D), 2,000 D, 3,000 D, 4,000 D, 5,000 D, 6,000 D, 7,000 D, 8,000 D, 9,000 D, or 10,000 D to about 5,000 D, 10,000 D, 15,000 D, 20,000 D, 25,000 D, 50,000 D, 75,000 D, 100,000 D, or 1,000,000 D. Preferably, the weight average molecular weight is in the range of about 1,000 D to about 30,000 D, more preferably about 1,000 D to about 20,000 D. The guanidyl copolymer can further have a degree of branching of about 10 to about 90%. The guanidyl copolymer is preferably a cationic polymer, and maintains a level of cationicity up to a pH of about 9, about 10, about 11, or about 12. In one embodiment, the cationicity of the polymer, as measured in milliequivilents per gram, varies by less than about 75%, more preferably less than about 50% from a pH of about 3 to a pH of about 10.

The guanidyl copolymer can be made by the condensation of an amine reactant selected from dicyanodiamine, guanamine, guanidine, melamine, cyanamine, guanylurea, or a mixture thereof; and a carbonyl reactant selected from formaldehyde, paraformaldehyde, urea, thiourea, glyoxal, acetaldehyde, propionaldehyde, butrylaldehyde, glutaraldehyde, acetone, or a mixture thereof.

The guanidyl copolymer can be made, for example, from about 1 wt. % to about 95 wt. %, about 10 wt. % to about 40 wt. %, or 10 wt. % to 40 wt. % guanidyl reactant; about 0 wt. % to about 95 wt. %, about 10 wt. % to about 40 wt. %, or 10 wt. % to 40 wt. % functional amine reactant; about 1 wt. % to about 98 wt. %, about 10 wt. % to about 40 wt. %, or 10 wt. % to 40 wt. % water-soluble salt; and about 1 wt. % to about 98 wt. %, about 10 wt. % to about 40 wt. %, or 10 wt. % to 40 wt. % carbonyl or imine reactant.

In a particular embodiment, the guanidyl copolymer is the condensation product of an amino base, formaldehyde, an alkylenepolyamine, and the ammonium salt of an inorganic or organic acid. Condensates of this type are well known and are described in U.S. Pat. Nos. 3,106,541, 3,410,649, 3,582,461, and 4,383,077, the disclosures of which are incorporated herein by reference. The condensate can also be made at a neutral or alkaline pH, for example those condensation products described in U.S. Pat. No. 3,015,649 which is incorporated herein by reference.

The guanidyl reactant can be selected from a group consisting of guanidine, guanidine salts, cyanamide, dicyanamide, biguanide, guanylurea, guanylthiourea, polycyclic guanidine, N-(4-aminobutyl)guanidine, 2-amino-5-guanidinopentanoic acid, imidodicarbonimidic diamide, (N-butylimidocarbonimidic diamide), (2-(methylguanidino) ethanoic acid), (2-[carbamimidoyl(methyl)amino]ethyl dihydrogen phosphate), cyanoguanidine, (2-guanidinoacetic acid), (3-(diaminomethylideneamino)propanoic acid), (N,N-dimethylimidodicarbonimidic diamide), (1-nitroguanidine), (4-amino-N-[amino(imino)methyl]benzenesulfonamide), (2-[10-(diaminomethylideneamino)decyl]guanidine dihydrochloride), melamine, alkyl guanidine, aryl guanidine, alkylaryl guanidine, alkyl biguanide, aryl biguanide, alkylaryl biguanide and combinations, salts, derivatives thereof and mixtures thereof. In another embodiment, the guanidyl reactant can be selected from the group consisting of guanidine, 2-cyanoguanidine, and a mixture thereof. In still another embodiment, the guanidyl reactant can be selected from the group consisting of guanidine, guanidine salts, biguanide, cyanoguanidine, melamine, and a mixture thereof.

The carbonyl reactant can be selected from a group of compounds that have a carbonyl functional group, for example, an aldehyde, a ketone, a urea, an amide, and a mixture thereof. Examples of carbonyl reactants include formaldehyde, acetaldehyde, paraformaldehyde, trioxane, urea, thiourea, glyoxal, acetaldehyde, propionaldehyde, butrylaldehyde, glutaraldehyde, acetone, and/or a formaldehyde source materials (e.g., hexamethylenetetramine). The carbonyl reactant can further include protected aldehydes, e.g., acetals. The imine reactant, for example, can be an aldimine, ketimine, imidate, amidate, or a mixture thereof.

The guanidyl copolymer can further include a functional amine reactant. Herein, a functional amine reactant can be an alkylenepolyamine having the formula $(alkyl)_x(amine)_y$, where the alkyl is selected from the group consisting of ethyl, propyl, butyl, pentyl, hexyl, and a mixture thereof, where x is in a range from 1 to 10, and y is in a range of 2 to 11; an aminoethylpiperizine; an alkanolamine; and a mixture thereof. For example, the alkylenepolyamine can be ethylenediamine, diethylenetriamine, triethylenetetramine, propylenediamine, dipropylenetriamine, ethylene propylene triamine, ethylene dipropylene tetramine, diethylene propylene tetramine, ethylene tripropylene pentamine, butylenediamine, pentylenediamine, hexamethylenediamine, tetraethylenepentamine, 1,2-propylenediamine, dibutylenetriamine, tributylenetetramine, tetrabutylenepentamine, dipentylenetriamine, tripentylenetetramine, tetrapentylenepentamine, and a mixture thereof. The functional amine reactant can be an alkylamine, alkyldiamine, alkenepolyamine, polyoxyalkylamine or diamine, alkanolamine (e.g., mono/di/tri ethanolamine) or a combination thereof. Additional functional amine reactants are described as aminopolymers in Organic Polymer Chemistry, 2nd ed., Chapman and Hall, 1988, pp. 341-357, and incorporated herein by reference.

The stabilization agent can further include a water-soluble salt. Water soluble salts include those salts with a cation selected from the group consisting of an ammonium ion, an alkali metal ion, an alkaline earth metal ion and a mixture thereof; and an anion. Examples include NaF, KF, $NH_4Cl$, LiCl, NaCl, KCl, RbCl, $MgCl_2$, $CaCl_2$, $SrCl_2$, $NH_4Br$, LiBr, NaBr, KBr, RbBr, $MgBr_2$, $CaBr_2$, $SrBr_2$, and other salts where the anion can be an oxyanion (e.g., formate, succinate, sulfite, sulfate, nitrite, nitrate, hydroxide, oxide, chlorite, and perchlorate). Preferably, the water-soluble salt is selected from the group consisting of KCl, $MgCl_2$, $CaCl_2$ and mixtures thereof. In one embodiment, the water-soluble salt can be obtained from a subterranean formation, for example, through the dissolution of the water-soluble salt in fracturing fluids. Herein, the fracturing fluids can be recycled or reused without removing the dissolved water-soluble salts. Additionally, the concentration of the water-soluble salt in the fracturing fluid can be increased through the admixing of an additional water-soluble salt with a recycled fracturing fluid or admixing a stabilization agent that includes water-soluble salt and the guanidyl copolymer with the recycled fracturing fluid.

The guanidyl copolymer and water-soluble salt can be mixed in a weight ratio of about 10:1 to about 1:10, about 5:1 to about 1:5, or about 1:1 to about 1:3, grams guanidyl copolymer to grams water-soluble salt. The ammonium salts include the reaction products of ammonium hydroxide and/or ammonia and hydrochloric, sulfuric, phosphoric, boric, formic, acetic, glycolic, propionic, and/or butyric acid.

In accordance with the compounds, compositions, and methods described herein, the reduction of clay swelling and/or fines migration in a subterranean formation can be accomplished by contacting the subterranean formation with a stabilization agent or composition that comprises a guanidyl copolymer. Contacting the subterranean formation can be accomplished, for example, by providing the stabilization agent or guanidyl copolymer-containing composition to the subterranean formation before, during, or after hydraulic fracturing or drilling. For example, the stabilization agent can be mixed with the fracturing fluid, often prior to fracturing. The fracturing fluid-stabilization agent-containing mixture can then be used to fracture a subterranean formation. In one embodiment, the stabilization agent is included in the fracturing fluid in an amount in a range of about 50 ppm to about 50,000 ppm, about 100 ppm to about 37,000 ppm, about 150 ppm to about 25,000 ppm, about 150 ppm to about 12,000 ppm, about 200 ppm to about 6,000 ppm, or about 300 ppm to about 2,600 ppm, based on the total weight of the fracturing fluid. The water soluble salt can be included in the fracturing fluid in an amount in a range of about 100 ppm to about 20,000 ppm, about 100 ppm to about 5,000 ppm, or about 100 ppm to about 2,000 ppm and the guanidyl copolymer can be included in the fracturing fluid in an amount in a range of about 50 ppm to about 5,000 ppm, about 100 ppm to about 1,000 ppm, or about 200 ppm to about 600 ppm, based on the total weight of the fracturing fluid. The fracturing fluids can further include, for example, proppants, friction reducers, disinfectants and/or salts.

In another embodiment, the materials and method of stabilizing a subterranean formation can be provided as a kit that includes a sufficient quantity of a guanidyl copolymer, fracturing fluid, and a water-soluble salt for on-site admixture with water, and, optionally, other stabilization components to stabilize the subterranean formation.

In another embodiment, the fracturing fluids described herein include a friction reducer; preferably, the stabilization agent includes the friction reducer. Typical friction reducer systems include an anionic friction reducer (e.g., a very high molecular weight (10 million to 20 million D) acrylamide/sodium acrylate copolymer) and further include anionic polyelectrolyte(s) which have a molecular weight of less than about 10,000 D and can be selected from the group consisting of polyacrylic acid, polymethacrylic acid, polyacrylate, polymethacrylate, partially hydrolyzed polyacrylamide, polyvinyl alcohol, polyvinyl acetate, polyvinylpyrrolidone and copolymers of maleic anhydride and acrylate monomers. Unlike the typical prior art friction reducer compositions, the herein presented methods and compositions preferably include a cationic friction reducer (e.g., a very high molecular weight polymer having a cationic charge; examples include but are not limited to acrylamide/dimethylaminoethyl acrylate-methyl chloride quaternary copolymers, quaternized guars, and guar gums). Preferably, the cationic friction reducer is a cationic polyacrylamide copolymer, preferably, having about 5 to about 35 mol % ammonium monomer units. Examples of cationic friction reducers include, but are not limited to, KemEflow C-4102, KemEflow C-4107, and KemEflow C-4604 (available from KEMIRA, Helsinki, Finland); FR-48W Friction Reducer (available from HALLIBURTON, Houston Tex., USA); OILAID-AFR-1, OILAID-FR-20, and OILAID-FR-30 (available from MESSINA INC., Dallas Tex., USA), and those cationic friction reducers disclosed in U.S. Pat. No. 6,787,506, incorporated herein by reference. The amount of cationic friction reducer used is between about 10 ppm to about 10,000 ppm, preferably about 100 to about 5,000 ppm, more preferably about 250 ppm to about 2,500 ppm, and even more preferably about 500 ppm to about 1,500 ppm, based on the total weight of the fracturing fluid.

Unexpectedly, the combination of the herein disclosed guanidyl copolymer and cationic friction reducer allows for significant reductions in the amount of friction reducer employed. For example, the guanidyl copolymer allows for a reduction of about 10% to about 90%, in some embodiments about 20% to about 80%, or about 30% to about 70% in the total dosage of the friction reducer added to the fracturing fluid. In one example, prior art friction reducer compositions may add 1 gallon of an anionic friction reducer per 1,000 gallons of water to achieve a predetermined level of friction reduction; with the compositions described herein, about 0.55 gallons, about 0.65 gallons, or about 0.75 gallons of cationic friction reducer can be added to 1,000 gallons of water to achieve the same predetermined level of friction reduction. This reduction in the amount of friction reducer necessary to achieve a predetermined level of friction reduction is, preferably, a reduction of at least about 10%, 20%, 30%, 40%, 50%, 60%, 70%, or 80%, and can lead to a significant cost savings over traditional compositions.

The result of the stabilization of the subterranean formation with the stabilization agent and compositions described herein is that particulates loosened from the subterranean formation by the process of removing the hydrocarbon product have reduced swell, have reduced subterranean migration, do not reduce the flow of the hydrocarbon product, and/or do not contaminate the hydrocarbon product. Without the stabilization agent, clays and/or fines can swell and/or migrate to inhibit and contaminate the hydrocarbon production. The stabilization effect can be measured by comparing wells with and without the stabilization agent or comparing the flow rate of fluids (e.g., oil, water or natural gas) through samples from the same subterranean formation with and without the stabilization agent.

Subterranean formations can be stabilized by contacting them with the above described guanidyl copolymer. In one embodiment, clay swelling and/or fines migration in a subterranean formation can be reduced by contacting the subterranean formation with a stabilization agent that comprises a guanidyl copolymer; and contacting the subterranean formation with a cationic friction reducer. The guanidyl copolymer and the cationic friction reducer can be pre-mixed and then directed into contact with the subterranean formation or alternatively, the guanidyl copolymer and the cationic friction reducer can be individually applied to, or provided to, the subterranean formation. The applied guanidyl copolymer can comprise the reaction product of a guanidyl reactant and a carbonyl reactant; wherein the carbonyl reactant is selected from the group consisting of an aldehyde, a ketone, a urea, an amide, and a mixture thereof; and wherein the guanidyl reactant is selected from the group consisting of guanidine, guanidine salt, cyanamide, dicyanamide, biguanide, guanylurea, guanylthiourea, polycyclic guanidine, N-(4-aminobutyl) guanidine, 2-amino-5-guanidinopentanoic acid, imidodicarbonimidic diamide, (N-butylimidocarbonimidic diamide), (2-(methylguanidino) ethanoic acid), (2-[carbamimidoyl (methyl)amino]ethyl dihydrogen phosphate), cyanoguanidine, (2-guanidinoacetic acid), (3-(diaminomethyleneamino)propanoic acid), (N,N-dimethylimidodicarbonimidic diamide), (1-nitroguanidine), (4-amino-N-[amino(imino)methyl]benzenesulfonamide), (2-[10-(diaminomethyleneamino)decyl]guanidine dihydrochloride), melamine, alkyl guanidine, aryl guanidine, alkylaryl guanidine, alkyl biguanide, aryl biguanide, alkylaryl biguanide, and a mixture thereof. Preferably, the guanidyl reactant is selected from the group consisting of guanidine, 2-cyanoguanidine, and a mixture thereof.

Preferably, the cationic friction reducer is selected from the group consisting of acrylamide/dimethylaminoethyl acrylate-methyl chloride quaternary copolymer, quaternized guar, guar gum, and mixtures thereof.

Contacting the subterranean formation with the stabilization agent and friction reducer can include providing the stabilization agent to the subterranean formation as a mixture with a suitable carrier, optionally as a mixture with the friction reducer and carrier. One example of a carrier for the stabilization agent is water.

In another embodiment, a (previously) hydraulically fractured subterranean formation can be restabilized by contacting the hydraulically fractured subterranean formation with a stabilization agent that comprises a guanidyl copolymer. The hydraulically fractured subterranean formation can be any hydraulically fractured subterranean formation, for example, those from which hydrocarbons have been extracted. Preferably, the hydraulically fractured subterranean formation is selected from the group consisting of a formation having a mineral content that is predominantly clay, shale, sand, and/or a mixture thereof. In one preferable embodiment, the hydraulically fractured subterranean formation consists of a formation having clay as the predominant mineral. In another preferable embodiment, the hydraulically fractured subterranean formation consists of a formation having shale as the predominant mineral.

The restabilization can include applying the stabilization agent as a component in a fracturing fluid (e.g., water), where the guanidyl copolymer comprises about 50 ppm to about 5,000 ppm, about 100 ppm to about 1,000 ppm, or about 200 ppm to about 600 ppm of the guanidyl copolymer in a fracturing fluid, based on the total weight of the fracturing fluid composition. The restabilization can also include refracturing the subterranean formation with a fracturing fluid that comprises the stabilization agent.

In still another embodiment, the guanidyl copolymer can be used in a method of flushing a bore hole during drilling with a drilling fluid that comprises a guanidyl copolymer. The drilling fluid can include about 50 ppm to about 5,000 ppm, about 100 ppm to about 1,000 ppm, or about 200 ppm to about 600 ppm of the guanidyl copolymer, based on the total weight of the drilling fluid composition. In one embodiment, flushing a bore hole includes applying the drilling fluid to the drill head during drilling.

The drilling fluid can be a foaming mud, a water-based mud, an oil-based mud, or a synthetic-fluid-based mud. The foaming mud is a mixture of a gas (e.g., air) and a foaming agent that includes the guanidyl polymer. The water-based mud is a mixture of water, the guanidyl polymer, and optionally, a thickening agent (preferably a shear-thinning thickening agent), a viscosity control agent (e.g., a thickener including xanthan gum, guar gum, glycol, carboxymethylcellulose, or starch), water-soluble salts, disinfectants, a lubricant, and/or a weighting agent. The oil-based and synthetic-fluid-based muds include either oil or a synthetic-fluid, the guanidyl polymer and, optionally, a thickening agent, a viscosity control agent, and/or a weighting agent.

The material being drilled can any subterranean formation, in one embodiment the method includes drilling a subterranean formation that comprises tar sands. In another embodiment the method includes drilling a subterranean formation that comprises a water-swellable clay mineral.

In yet another embodiment, a method of extracting oil from an oil containing subterranean formation can include providing, through a first borehole, a pressurized floodwater (waterflood) that comprises about 50 ppm to about 5,000 ppm, about 100 ppm to about 1,000 ppm, or about 200 ppm to about 600 ppm of a guanidyl copolymer; and recovering oil from the subterranean formation through a second borehole. Preferably, the subterranean formation was previously hydraulically fractured and oil was previously extracted.

The composition and application of the pressurized floodwater (e.g., at pressure in a range of about 100 psi to about 1800 psi, about 100 psi to about 1000 psi, about 100 psi to about 800 psi, about 125 psi to about 600 psi, about 150 psi to about 500 psi, at about 250 psi to about 500 psi, or at about 250 psi) can be adjusted according to the needs of the subterranean formation. For example when the subterranean formation comprises tar sands, the pressurized floodwater can include steam. In this embodiment, the guanidyl copolymer can be the reaction product of an aldehyde reactant selected from the group consisting of formaldehyde, paraformaldehyde, urea, thiourea, glyoxal, acetaldehyde, propionaldehyde, butrylaldehyde, glutaraldehyde, acetone, and a mixture thereof; and a guanidyl reactant is selected from a group consisting of guanidine, guanidine salt, cyanamide, dicyanamide, biguanide, guanylurea, guanylthiourea, polycyclic guanidine, N-(4-aminobutyl)guanidine, 2-amino-5-guanidinopentanoic acid, imidodicarbonimidic diamide, (N-butyl-imidocarbonimidic diamide), (2-(methylguanidino) ethanoic acid), (2-[carbamimidoyl(methyl)amino]ethyl dihydrogen phosphate), cyanoguanidine, (2-guanidinoacetic acid), (3-(diaminomethyleneamino)propanoic acid), (N,N-dimethylimidodicarbonimidic diamide), (1-nitroguanidine), (4-amino-N-[amino(imino)methyl]benzenesulfonamide), (2-[10-(diaminomethyleneamino)decyl]guanidine dihydrochloride), melamine, alkyl guanidine, aryl guanidine, alkylaryl guanidine, alkyl biguanide, aryl biguanide, alkylaryl biguanide, and a mixture thereof.

Floodwater compositions include the guanidyl copolymer and water (e.g., the well's produced water). The floodwater can optionally include disinfectants, oxygen scavenging agents, and/or water-soluble salts, in typically applied amounts.

EXAMPLES

The following examples are provided to illustrate the invention, but are not intended to limit the scope thereof.

Example 1

Capillary Suction Time (CST) tests were measured as a determination of the relative flow capacity of a slurry of ground formation rock used to form an artificial core. The CST test is a common test for materials as wellbore stabilizers and multiple, well known manual and automated testing equipment is available for conducting the test, as well known to those skilled in the art. Here, the mineral sample was ground to a −70 mesh grind (U.S. Standard), then 5 grams were placed in 50 ml of a test fluid (the test fluid comprising the stabilization agent and water) and stirred on a magnetic stirrer, in day one trials for 2 hours and in day two trials for 24 hours. Then 5 mL of this slurry was placed in a cylindrical "mold" setting on top of chromatography paper. The rate of capillary flow into the chromatography paper was measured by timing the time necessary for an observable fluid to from a point 0.25 inches away from the mold to a point one inch away from the mold. The shorter the time necessary to flow the recorded distance the greater the stability of the mineral sample to swelling and/or fines migration. For example, a mineral with dispersible or swelling clays would have lower pseudo permeability and will have a longer CST time while one without clay or other fine particles would have a shorter retention time. It cannot be used to examine fluids containing surface active agents.

Here, the data obtained from the CST tests is reported as a CST Ratio obtained from the equation $[CST_{sample} - CST_{blank}]/CST_{blank}$. Where $CST_{blank}$ is the CST time for the test fluid to flow the required distance without a mineral sample in the mold.

Capillary Suction Time for samples of Marcellus Shale:

| Stabilization Agent | Dosage (ppm) | CST Ratio Day One | CST Ratio Day Two |
|---|---|---|---|
| Blank | | 0.1 | 0.1 |
| Fresh Water | | 4.0 | 5.8 |
| Comparative Stabilizers | | | |
| Choline chloride | 20,000 | 3.3 | 3.3 |
| Choline chloride | 2,000 | 3.5 | 3.6 |
| Trimethylamine | 20,000 | 3.4 | 3.5 |
| Trimethylamine | 2,000 | 3.6 | 3.7 |
| Herein Disclosed Stabilizer | | | |
| Guanidyl copolymer | 300 | 2.1 | 2.1 |

Capillary Suction Time for samples of Marcellus Shale (with added water-soluble salt):

| Stabilization Agent | Dosage (ppm) | CST Ratio Day One | CST Ratio Day Two |
|---|---|---|---|
| Blank | | 0.1 | 0.1 |
| Fresh Water | | 4.0 | 5.8 |
| Water-Soluble Salts | | | |
| Potassium Chloride | 20,000 | 1.8 | 2.8 |
| Potassium Chloride | 2,000 | 3.0 | 3.2 |
| Magnesium Chloride | 20,000 | 3.3 | 3.8 |
| Magnesium Chloride | 2,000 | 3.0 | 4.0 |
| Calcium Chloride | 20,000 | 3.2 | 4.4 |
| Calcium Chloride | 2,000 | 3.0 | 4.3 |
| Comparative Stabilizer (A) - polyEPDMA | | | |
| Poly EPDMA | 300 | 2.5 | 2.5 |
| Poly EPDMA Potassium Chloride | 300 2,500 | 2.3 | 4.2 |
| Poly EPDMA Calcium Chloride | 300 1,200 | 2.8 | 2.8 |
| Comparative Stabilizer (B) - polyDADMAC | | | |
| Poly DADMAC | 300 | 2.0 | 2.1 |
| Poly DADMAC Potassium Chloride | 300 2,500 | 2.7 | 3.5 |
| Poly DADMAC Calcium Chloride | 300 1,200 | 2.3 | 2.3 |
| Herein Disclosed Stabilizer | | | |
| Guanidyl Copolymer | 300 | 2.1 | 2.1 |
| Guanidyl Copolymer Potassium Chloride | 300 2,500 | 1.8 | 3.0 |
| Guanidyl Copolymer Calcium Chloride | 300 1,200 | 1.8 | 2.0 |
| Guanidyl Copolymer Magnesium Chloride | 300 1,500 | 1.8 | 2.2 |

Example 2

Roller Oven Shale Stability data were obtained using a modified API RP 13i procedure. Here, the shale is ground to a particle size less than 2 mm (10 mesh) and larger than 0.425 mm (40 mesh). The particles are split equally using a spinning Riffler then distributed equally into 10 gm samples. The number of samples depends on the number of fluids to be tested. The weighed sample is placed in a glass bottle along with 50 ml of the test fluid and allowed to roll in a roller oven at a desired temperature. The samples are then screened through 70 mesh screen (0.269 mm) and washed with deionized water prior to drying and reweighing. The amount of sample pass through the 70 mesh screen is the measure of instability of the shale. The higher the percentage of solids passed through the 70 mesh screen, the lower the stability of the shale in that particular fluid.

The mass of sample passed through 70 mesh screen (0.269 mm) is expressed as a mass fraction in percent, $M_P = (M_I - M_F)/M_I * 100$; $M_P$ = Mass of shale passed through 70 mesh screen, $M_I$ = Initial mass of shale sample, $M_F$ = Final dry mass of shale sample.

Roller Oven Shale Stability Marcellus Shale:

| | Dosage (ppm) | % Solids Not Retained |
|---|---|---|
| Fresh Water | — | 5.9 |
| Comparative Stabilizers | | |
| Choline chloride | 20,000 | 5.0 |
| Choline chloride | 2,000 | 5.4 |

-continued

| | Dosage (ppm) | % Solids Not Retained |
|---|---|---|
| Trimethylamine | 20,000 | 5.3 |
| Trimethylamine | 2,000 | 5.6 |
| Herein Disclosed Stablizer | | |
| Guanidyl copolymer | 300 | 3.3 |

Roller Oven Shale Stability Marcellus Shale (with water-soluble salt):

| | Dosage (ppm) | % Solids Not Retained |
|---|---|---|
| Fresh Water | — | 5.9 |
| Water-Soluble Salts | | |
| Potassium Chloride | 20,000 | 4.8 |
| Potassium Chloride | 2,000 | 5.3 |
| Calcium Chloride | 20,000 | 4.6 |
| Calcium Chloride | 2,000 | 4.5 |
| Lithium Chloride | 12,000 | 5.3 |
| Lithium Chloride | 1,500 | 6.2 |
| Magnesium Chloride | 30,000 | 4.7 |
| Magnesium Chloride | 5,000 | 4.1 |
| Magnesium Sulfate | 30,000 | 5.5 |
| Magnesium Sulfate | 5,000 | 5.3 |
| Cesium Chloride | 40,000 | 4.3 |
| Cesium Chloride | 6,000 | 4.9 |
| Choline chloride | 20,000 | 5.0 |
| Choline chloride | 2,000 | 5.4 |
| Trimethylamine | 20,000 | 5.3 |
| Trimethylamine | 2,000 | 5.6 |
| Comparative Stabilizer (A) - polyEPDMA | | |
| Poly EPDMA | 300 | 3.5 |
| Poly EPDMA | 300 | 3.9 |
| Calcium Chloride | 1,000 | |
| Comparative Stabilizer (B) - polyDADMAC | | |
| Poly DADMAC | 300 | 3.7 |
| Poly DADMAC | 300 | 3.6 |
| Calcium Chloride | 1,000 | |
| Herein Disclosed Stabilizer | | |
| Guanidyl Copolymer | 300 | 3.3 |
| Guanidyl Copolymer | 300 | 2.9 |
| Calcium Chloride | 1,000 | |

Example 3

Core tests were obtained to verify the performance of the herein disclosed guanidyl copolymers. A 1 in. diameter drilled core sample was horizontally fractured (most often along a bedding plane) and the core sample was placed in a Hassler sleeve core holder for flow studies. The permeability of the core samples were then measured (in microdarcy ($\Box$d)). First, the core sample was exposed to hexane (conductivity was 6.47 $\Box$d-ft), then a brine solution having 600 ppm guanidyl copolymer was added and the conductivity decreased to 0.47 $\Box$d-ft (an expected change due to the transition from a non-wetting to wetting solution). Next, the core sample was flushed with fresh water and a conductivity of 0.42 $\Box$d-ft was measured, suggesting stability of the core sample. Notably, core samples tested with only a temporary clay stabilizer plugged immediately upon flushing with fresh water and no conductivity data could be obtained.

Example 4

Friction Reduction: the pressure and percent friction reduction for comparative and herein describes materials were obtained using a friction loop apparatus. The friction loop apparatus was a closed loop pipeline designed to measure pressure drop across a 35 foot section of a stainless steel pipe having a 0.54 inch nominal diameter. The friction loop was operated at a flow rate of 16 gallons per minute, a starting temperature of about 80° F., a pipe roughness factor of $1 \times 10^{-5}$ inches. This friction loop generated Reynolds numbers in a range of 50,000 to 70,000 at a flow rate of 10 gallons per minute and a range of 120,000 to 140,000 at 16 gallons per minute. Differential pressure was continually measured across the test section at one-second intervals for a period of about 35 minutes. The first minute of the test was used to establish a baseline pressure drop. The pressure drop across the thirty five (35) foot section of pipe for the water was calculated from the flow rate and pipe dimensions in accordance with the flowing formula:

$$\Delta P_{water} = \frac{\rho V^2 L f}{2 g_c D_h}$$

wherein $\Delta P^\circ_{water}$ is the calculated pressure drop for water, $\rho$ is density, V is the velocity, L is length, $g_c$ is the gravitational constant, and $D_h$ is the pipe diameter. The variable f was calculated in accordance with the formula for turbulent flow below:

$$f = \left\{-2\log\left[\frac{\varepsilon/d}{3.7} - \frac{5.02}{N_{Re}}\log\left(\frac{\varepsilon/d}{3.7} - \frac{14.5}{N_{Re}}\right)\right]\right\}^{-2}$$

wherein the variable $\varepsilon$ is the pipe roughness, the variable d is the pipe diameter, and the variable $N_{Re}$ is the Reynolds Number.

Following addition of the particular friction reducing composition to the tank, the measured was compared to the calculated pressure drop for water to determine a percent friction reduction in accordance with the equation:

$$\% FR = \frac{\Delta P_{solvent} - \Delta P_{solution}}{\Delta P_{solvent}}$$

wherein % FR is the percent friction reduction, $\Delta P_{solvent}$ is the pressure drop across the test section for pure solvent (water or test brine), and $\Delta P_{solution}$ is the pressure drop across the test section for the solution of water or test brine, and friction reducer.

Results are presented in the following tables:

Comparative pipe pressures for Anionic Friction Reducer (FLOPAM DR-7000 available from SNF, Inc., Riceboro, Ga., USA) over 35 minutes

| Anionic Friction Reducer | Choline Chloride | Calcium Chloride | 5 Minutes | 20 Minutes | 35 Minutes |
|---|---|---|---|---|---|
| 300 ppm | | | 60 psi | 64 psi | 70 psi |
| 300 ppm | 1500 ppm | | 59 psi | 64 psi | 70 psi |
| 300 ppm | 1500 ppm | 1000 ppm | 75 psi | 100 psi | 120 psi |
| 150 ppm | | | 60 psi | 82 psi | 120 psi |
| 150 ppm | 1500 ppm | | 59 psi | 81 psi | 120 psi |
| 150 ppm | 1500 ppm | 1000 ppm | 85 psi | 140 psi | 170 psi |

Comparative percent friction reduction for Anionic Friction Reducer (FLOPAM DR-7000 available from SNF, Inc., Riceboro, Ga., USA) over 35 minutes

| Anionic Friction Reducer | Choline Chloride | Calcium Chloride | 5 Minutes | 20 Minutes | 35 Minutes |
|---|---|---|---|---|---|
| 300 ppm | | | 74% | 72% | 68% |
| 300 ppm | 1500 ppm | | 75% | 72% | 68% |
| 300 ppm | 1500 ppm | 1000 ppm | 70% | 55% | 47% |
| 150 ppm | | | 74% | 60% | 50% |
| 150 ppm | 1500 ppm | | 75% | 60% | 50% |
| 150 ppm | 1500 ppm | 1000 ppm | 60% | 40% | 30% |

Pipe Pressures for Herein-Described System (using CALLAWAY C4802 as the cationic friction reducer, available from KEMIRA) over 35 minutes

| Cationic Friction Reducer | Guanidyl Copolymer | Calcium Chloride | 5 Minutes | 20 Minutes | 35 Minutes |
|---|---|---|---|---|---|
| 200 ppm | | | 60 psi | 66 psi | 72 psi |
| 200 ppm | | 1000 ppm | 61 psi | 68 psi | 74 psi |
| 200 ppm | 900 ppm | | 59 psi | 65 psi | 70 psi |
| 200 ppm | 900 ppm | 1000 ppm | 59 psi | 63 psi | 68 psi |
| 150 ppm | | | 60 psi | 85 psi | 120 psi |
| 150 ppm | | 1000 ppm | 60 psi | 87 psi | 125 psi |
| 150 ppm | 900 ppm | | 60 psi | 72 psi | 110 psi |
| 150 ppm | 900 ppm | 1000 ppm | 60 psi | 75 psi | 100 psi |

Percent Friction Reduction for Herein-Described System (using CALLAWAY C4802 as the cationic friction reducer, available from KEMIRA) over 35 minutes

| Cationic Friction Reducer | Guanidyl Copolymer | Calcium Chloride | 5 Minutes | 20 Minutes | 35 Minutes |
|---|---|---|---|---|---|
| 200 ppm | | | 74% | 72% | 66% |
| 200 ppm | | 1000 ppm | 73% | 70% | 64% |
| 200 ppm | 900 ppm | | 75% | 73% | 68% |
| 200 ppm | 900 ppm | 1000 ppm | 75% | 74% | 70% |
| 150 ppm | | | 74% | 58% | 50% |
| 150 ppm | | 1000 ppm | 74% | 57% | 45% |
| 150 ppm | 900 ppm | | 74% | 66% | 52% |
| 150 ppm | 900 ppm | 1000 ppm | 74% | 62% | 55% |

The foregoing description is given for clearness of understanding only, and no unnecessary limitations should be understood therefrom, as modifications within the scope of the invention may be apparent to those having ordinary skill in the art.

What is claimed:

1. A method of reducing clay swelling and/or fines migration in a subterranean formation comprising:
   contacting the subterranean formation, before or during hydraulic fracturing, with a stabilization agent that comprises a guanidyl copolymer, thereby increasing permeability of the subterranean formation.

2. The method of claim 1, wherein the guanidyl copolymer comprises a reaction product of a guanidyl reactant and a carbonyl reactant selected from the group consisting of an aldehyde, a ketone, a urea, an amide, and a mixture thereof; and
   wherein the guanidyl reactant is selected from the group consisting of guanidine, 2-cyanoguanidine, guanidine salt, cyanamide, dicyanamide, biguanide, guanylurea, guanylthiourea, polycyclic guanidine, N-(4-aminobutyl)guanidine, 2-amino-5-guanidinopentanoic acid, imidodicarbonimidic diamide, (N-butylimidocarbonimidic diamide), (2-(methylguanidino) ethanoic acid), (2-[carbamimidoyl(methyl)amino]ethyl dihydrogen phosphate), cyanoguanidine, (2-guanidinoacetic acid), (3-(diaminomethylideneamino)propanoic acid), (N,N-dimethylimidodicarbonimidic diamide), (1-nitroguanidine), (4-amino-N-[amino(imino)methyl]benzenesulfonamide), (2-[10-(diaminomethylideneamino)decyl]guanidine dihydrochloride), melamine, alkyl guanidine, aryl guanidine, alkylaryl guanidine, alkyl biguanide, aryl biguanide, alkylaryl biguanide, and a mixture thereof.

3. The method of claim 2, wherein the guanidyl reactant is selected from the group consisting of guanidine, 2-cyanoguanidine, and a mixture thereof.

4. The method of claim 1, wherein the stabilization agent further comprises a water-soluble salt that comprises an anion and a cation selected from the group consisting of an ammonium ion, an alkali metal ion, an alkaline earth metal ion and a mixture thereof; and
   wherein the guanidyl copolymer is the condensation product of a guanidyl reactant selected from the group consisting of guanidine, guanidine salt, cyanamide, dicyanamide, biguanide, guanylurea, guanylthiourea, polycyclic guanidine, N-(4-aminobutyl)guanidine, 2-amino-5-guanidinopentanoic acid, imidodicarbonimidic diamide, (N-butylimidocarbonimidic diamide), (2-(methylguanidino) ethanoic acid), (2-[carbamimidoyl(methyl)amino]ethyl dihydrogen phosphate), cyanoguanidine, (2-guanidinoacetic acid), (3-(diaminomethylideneamino)propanoic acid), (N,N-dimethylimidodicarbonimidic diamide), (1-nitroguanidine), (4-amino-N-[amino(imino)methyl]benzenesulfonamide), (2-[10-(diamino-methylideneamino)decyl]guanidine dihydrochloride), melamine, alkyl guanidine, aryl guanidine, alkylaryl guanidine, alkyl biguanide, aryl biguanide, alkylaryl biguanide, and a mixture thereof and a carbonyl reactant; and a carbonyl reactant selected from the group consisting of an aldehyde, a ketone, a urea, an amide, and a mixture thereof.

5. The method of claim 4, wherein the water-soluble salt is selected from the group consisting of potassium chloride, magnesium chloride, calcium chloride, and a mixture thereof.

6. The method of claim 1, wherein the stabilization agent further comprises a cationic friction reducer; and
   wherein the guanidyl copolymer is the condensation product of a guanidyl reactant selected from the group consisting of guanidine, guanidine salt, cyanamide, dicyanamide, biguanide, guanylurea, guanylthiourea, polycyclic guanidine, N-(4-aminobutyl)guanidine, 2-amino-5-guanidinopentanoic acid, imidodicarbonimidic diamide, (N-butylimidocarbonimidic diamide), (2-(methylguanidino) ethanoic acid), (2-[carbamimidoyl(methyl)amino]ethyl dihydrogen phosphate), cyanoguanidine, (2-guanidinoacetic acid), (3-(diaminomethylideneamino)propanoic acid), (N,N-dimethylimidodicarbonimidic diamide), (1-nitroguanidine), (4-amino-N-[amino(imino)methyl]benzenesulfonamide), (2-[10-(diamino-methylideneamino)decyl]guanidine dihydrochloride), melamine, alkyl guanidine, aryl guanidine, alkylaryl guanidine, alkyl biguanide, aryl biguanide, alkylaryl biguanide, and a mixture thereof and a carbonyl reactant; and a carbonyl reactant selected from the group consisting of an aldehyde, a ketone, a urea, an amide, and a mixture thereof.

7. The method of claim 6, wherein the cationic friction reducer is selected from the group consisting of acrylamide/dimethylaminoethyl acrylate-methyl chloride quaternary copolymer, quaternized guar, guar gum, and mixtures thereof.

8. A method of reducing clay swelling and/or fines migration thereby increasing permeability of a subterranean formation comprising:
contacting the subterranean formation with a stabilization agent that comprises a guanidyl copolymer that is a reaction product of a guanidyl reactant, a carbonyl reactant, and a functional amine reactant;
wherein the carbonyl reactant is selected from the group consisting of an aldehyde, a ketone, a urea, an amide, and a mixture thereof; and
wherein the guanidyl reactant is selected from the group consisting of guanidine, guanidine salt, cyanamide, dicyanamide, biguanide, guanylurea, guanylthiourea, polycyclic guanidine, N-(4-aminobutyl)guanidine, 2-amino-5-guanidinopentanoic acid, imidodicarbonimidic diamide, (N-butylimidocarbonimidic diamide), (2-(methylguanidino) ethanoic acid), (2-[carbamimidoyl(methyl)amino]ethyl dihydrogen phosphate), cyanoguanidine, (2-guanidinoacetic acid), (3-(diaminomethylideneamino)propanoic acid), (N,N-dimethylimidodicarbonimidic diamide), (1-nitroguanidine), (4-amino-N-[amino(imino)methyl]benzenesulfonamide), (2-[10-(diamino-methylideneamino)decyl] guanidine dihydrochloride), melamine, alkyl guanidine, aryl guanidine, alkylaryl guanidine, alkyl biguanide, aryl biguanide, alkylaryl biguanide, and a mixture thereof.

9. The method of claim 8, wherein the functional amine reactant is selected from the group consisting of an alkylenepolyamine having the formula (alkyl)$_x$(amine)$_y$ where the alkyl is selected from the group consisting of ethyl, propyl, butyl, pentyl, hexyl, and a mixture thereof, where x is in a range from 1 to 10, and y is in a range of 2 to 11; an aminoethylpiperizine, an alkanolamine, and a mixture thereof.

10. A method of reducing clay swelling and/or fines migration in a subterranean formation comprising:
contacting the subterranean formation with a stabilization agent that comprises a guanidyl copolymer that is the condensation product of
a guanidyl reactant selected from the group consisting of dicyanodiamine, guanamine, guanidine, melamine, cyanamine, guanylurea, and a mixture thereof; and
a carbonyl reactant selected from the group consisting of formaldehyde, paraformaldehyde, urea, thiourea, glyoxal, acetaldehyde, propionaldehyde, butrylaldehyde, glutaraldehyde, acetone, and a mixture thereof.

11. A method of reducing clay swelling and/or fines migration in a subterranean formation during and/or after hydraulic fracturing of a well comprising:
admixing a guanidyl copolymer and a fracturing fluid to form an admixture of the guanidyl copolymer and the fracturing fluid; and
contacting the subterranean formation with the admixture of the guanidyl copolymer and fracturing fluid to form a stabilized subterranean formation.

12. The method of claim 11, wherein the admixture comprises about 50 ppm to about 5,000 ppm of the guanidyl copolymer.

13. The method of claim 12, wherein the admixture comprises about 100 ppm to about 1,000 ppm of the guanidyl copolymer.

14. The method of claim 13, wherein the admixture comprises about 200 ppm to about 600 ppm of the guanidyl copolymer.

15. The method of claim 11, wherein the admixture further comprises a water-soluble salt.

16. The method of claim 15, wherein the admixture comprises about 100 ppm to about 20,000 ppm of the water-soluble salt.

17. The method of claim 16, wherein the admixture comprises about 100 ppm to about 5,000 ppm of the water-soluble salt.

18. The method of claim 17, wherein the admixture comprises about 100 ppm to about 2,000 ppm of the water-soluble salt.

19. The method of claim 11, wherein the admixture further comprises a cationic friction reducer.

20. The method of claim 19, wherein the admixture comprises about 50 ppm to about 1,000 ppm of the cationic friction reducer.

21. The method of claim 19, wherein the admixture further comprises a water-soluble salt.

22. A method of restabilizing a well from which hydrocarbons have been extracted, comprising:
contacting a hydraulically fractured subterranean formation from which hydrocarbons have been extracted with a stabilization agent to form a restabilized well; the stabilization agent comprising a guanidyl copolymer which is the condensation product of a guanidyl reactant selected from the group consisting of guanidine, guanidine salt, cyanamide, dicyanamide, biguanide, guanylurea, guanylthiourea, polycyclic guanidine, N-(4-aminobutyl)guanidine, 2-amino-5-guanidinopentanoic acid, imidodicarbonimidic diamide, (N-butylimidocarbonimidic diamide), (2-(methylguanidino) ethanoic acid), (2-[carbamimidoyl(methyl)amino]ethyl dihydrogen phosphate), cyanoguanidine, (2-guanidinoacetic acid), (3-(diaminomethylideneamino)propanoic acid), (N,N-dimethylimidodicarbonimidic diamide), (1-nitroguanidine), (4-amino-N-[amino (imino)methyl]benzenesulfonamide), (2-[10-(diamino-methylideneamino)decyl]guanidine dihydrochloride), melamine, alkyl guanidine, aryl guanidine, alkylaryl guanidine, alkyl biguanide, aryl biguanide, alkylaryl biguanide, and a mixture thereof and a carbonyl reactant; and a carbonyl reactant selected from the group consisting of an aldehyde, a ketone, a urea, an amide, and a mixture thereof.

23. The method of claim 22 further comprising: recovering hydrocarbons from the restabilized well.

24. The method of claim 23, wherein the hydraulically fractured subterranean formation comprises the clay formation.

25. The method of claim 23, wherein the hydraulically fractured subterranean formation comprises the shale formation.

26. The method of claim 22, wherein the hydraulically fractured subterranean formation is selected from the group consisting of a clay formation, a shale formation, a sand formation, and a mixture thereof.

27. The method of claim 22, wherein the stabilization agent is a component of a fracturing fluid in a concentration of about 50 ppm to about 5,000 ppm guanidyl copolymer, based on the total weight of the fracturing fluid.

28. The method of claim 27, wherein the stabilization agent comprises about 100 ppm to about 1,000 ppm guanidyl copolymer, based on the total weight of the fracturing fluid.

29. The method of claim 28, wherein the stabilization agent comprises about 200 ppm to about 600 ppm guanidyl copolymer, based on the total weight of the fracturing fluid.

30. The method of claim 22 further comprising: refracturing the hydraulically fractured subterranean formation from which hydrocarbons have been extracted with a fracturing fluid that comprises the stabilization agent.

* * * * *